May 21, 1940.    J. R. SKOVERSKI    2,201,351
FISHING LEADER
Filed Feb. 14, 1938
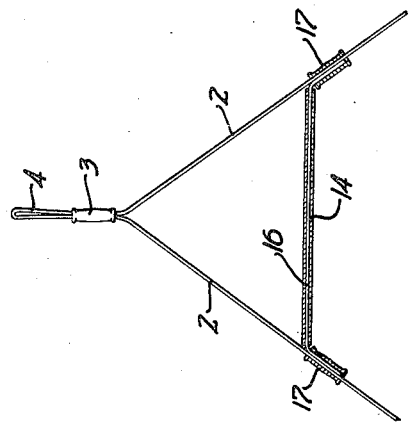
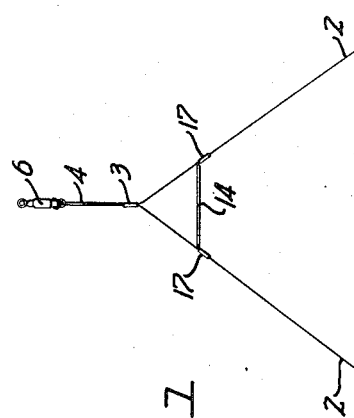
INVENTOR
JOHN R. SKOVERSKI
BY Charles J. Ennis
HIS ATTORNEY

UNITED STATES PATENT OFFICE 2,201,351

FISHING LEADER

John R. Skoverski, Oakland, Calif., assignor to Joseph Schor, San Francisco, Calif.

Application February 14, 1938, Serial No. 190,428

3 Claims. (Cl. 43—28)

My invention relates to fishing tackle; and the broad object of the invention is to provide a leader having diverging strands and a spreader for holding the strands apart.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a side elevational view of a fishing leader embodying the improvements of my invention; and Figure 2 is a fragmentary view showing the spreader bar and fastening sleeves in section.

In terms of broad inclusion, the fishing leader of my invention comprises a pair of diverging strands, and a spreader for holding the strands apart. The strands are preferably formed from a one-piece element, and means are preferably provided for fastening portions of the leader element together at the apex of the diverging strands to form a loop at the upper end of the leader. The free ends of the strands are also preferably folded back to form loops at the lower ends of the leader.

In greater detail, and referring to the drawing, my leader comprises a pair of diverging strands 2 preferably formed from a one-piece element doubled back adjacent its intermediate portions to form the two strands. This element may be of wire, gut, or any other suitable material. I have used a stainless steel stranded wire with good results.

The folded back portions of the leader are clamped together by a metal sleeve 3 to form a loop 4 above the apex of the diverging strands 2. This loop at the upper end of the leader provides means for connecting the latter with a fishing line. A swivel 6 is preferably fastened to the loop, so that the swivel is interposed between the line and leader. The free ends of strands 2 are also preferably folded back and fastened by metal sleeves 7 to provide loops 8 at the lower ends of the leader.

One of the diverging strands is preferably shorter than the other, and in the preferred use of the leader a sinker 9 is anchored to this strand; a suitable swivel 11 and snap fastener 12 being connected to the strand by loop 8 for purposes of attaching the sinker. The other strand is longer and a hook 13 is connected to it by the loop 8. By this arrangement the hook is able to lie on bottom, yet is held outwardly away from the sinker.

Means are also provided for holding the diverging strands apart. For this purpose a spreader bar 14 is provided, extending transversely between the strands adjacently below their apex, so that the spreader is arranged in triangular relationship with the diverging strands. The spreader bar is preferably of metal and is tubular for encircling a strand 16 which holds the bar in place. This holding strand may be of the same material as strands 2. The ends of strand 16 are preferably fastened to the strands 2 by metal clamping sleeves 17.

I claim:

1. A fishing leader comprising a pair of diverging strands, a transverse strand extending between the diverging strands and fastened to the latter, and a tubular spreader bar encircling said transverse strand.

2. A fishing leader comprising a pair of diverging strands, a transverse strand extending between the diverging strands, sleeves for clamping the ends of the transverse strand to the diverging strands, and a tubular spreader bar encircling said transverse strand.

3. A fishing leader comprising a one-piece element doubled back to form a pair of diverging strands with portions of the element fastened together to provide a loop at the apex of said diverging strands, a transverse strand extending between the diverging strands and fastened to the latter, and a tubular spreader bar encircling said transverse strand.

JOHN R. SKOVERSKI.